(12) United States Patent
Goto

(10) Patent No.: US 8,716,990 B2
(45) Date of Patent: May 6, 2014

(54) SYNCHRONOUS RECTIFYING DC-TO-DC CONVERTER DEVICE WITH COMPENSATED LOW-SIDE SWITCH OFFSET VOLTAGE

(75) Inventor: Yuichi Goto, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 336 days.

(21) Appl. No.: 13/234,788

(22) Filed: Sep. 16, 2011

(65) Prior Publication Data

US 2012/0176108 A1   Jul. 12, 2012

(30) Foreign Application Priority Data

Jan. 11, 2011   (JP) .................................. 2011-003042

(51) Int. Cl.
*H02M 3/158*   (2006.01)

(52) U.S. Cl.
USPC .......................................................... 323/271

(58) Field of Classification Search
USPC .................. 323/222, 271, 282, 225, 268, 285
See application file for complete search history.

(56) References Cited

U.S. PATENT DOCUMENTS

| | | | | |
|---|---|---|---|---|
| 7,292,018 B2 * | 11/2007 | Chen | ............................. | 323/222 |
| 7,675,275 B2 * | 3/2010 | Ruobiao et al. | ............... | 323/285 |
| 8,013,586 B2 * | 9/2011 | Tlaskal et al. | ................ | 323/282 |
| 8,400,129 B2 * | 3/2013 | Ouyang | ........................ | 323/283 |
| 2010/0026259 A1 | 2/2010 | Ozaki et al. | | |

FOREIGN PATENT DOCUMENTS

JP   2002-281744   9/2002

* cited by examiner

*Primary Examiner* — Matthew Nguyen
*Assistant Examiner* — Jye-June Lee
(74) *Attorney, Agent, or Firm* — White & Case LLP

(57) ABSTRACT

According to one embodiment, a DC-to-DC converter includes a high-side switch, a low-side switch, a high-side controller, and a low-side controller. The low-side switch is connected to the high-side switch in series. The high-side controller is configured to control the high-side switch. The low-side controller includes a first detector and an offset canceller. The first detector is configured to detect a current of the low-side switch. The offset canceller is configured to hold an output of the first detector as an offset voltage when the low-side switch is off and compensate an output of the first detector by the offset voltage when the low-side switch is on. The low-side controller is configured to compare a compensated output of the first detector with a reference voltage and turn off the low-side switch.

15 Claims, 2 Drawing Sheets

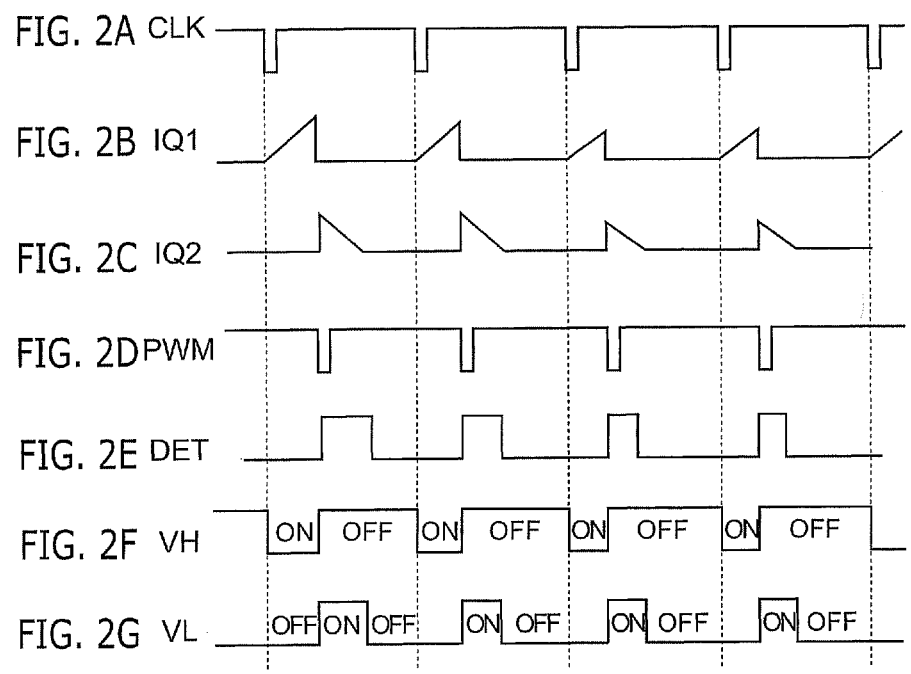

SYNCHRONOUS RECTIFYING DC-TO-DC CONVERTER DEVICE WITH COMPENSATED LOW-SIDE SWITCH OFFSET VOLTAGE

CROSS-REFERENCE TO RELATED APPLICATIONS

This application is based upon and claims the benefit of priority from the prior Japanese Patent Application No. 2011-003042, filed on Jan. 11, 2011; the entire contents of which are incorporated herein by reference.

FIELD

Embodiments described herein relate generally to a DC-to-DC converter.

BACKGROUND

DC-to-DC converters that alternately turn on and off a high-side switch and a low-side switch to drive an inductor according to the synchronous rectification mode are used as a highly efficient power supply.

Since the DC-to-DC converter performs switching on the low side in the synchronous rectification mode, the current of the inductor sometimes flows backward through the low-side switch to cause power efficiency to worsen when the current is small.

BRIEF DESCRIPTION OF THE DRAWINGS

FIG. 2A to FIG. 2G show timing charts of main signals of the DC-to-DC converter.

DETAILED DESCRIPTION

Figure 1:
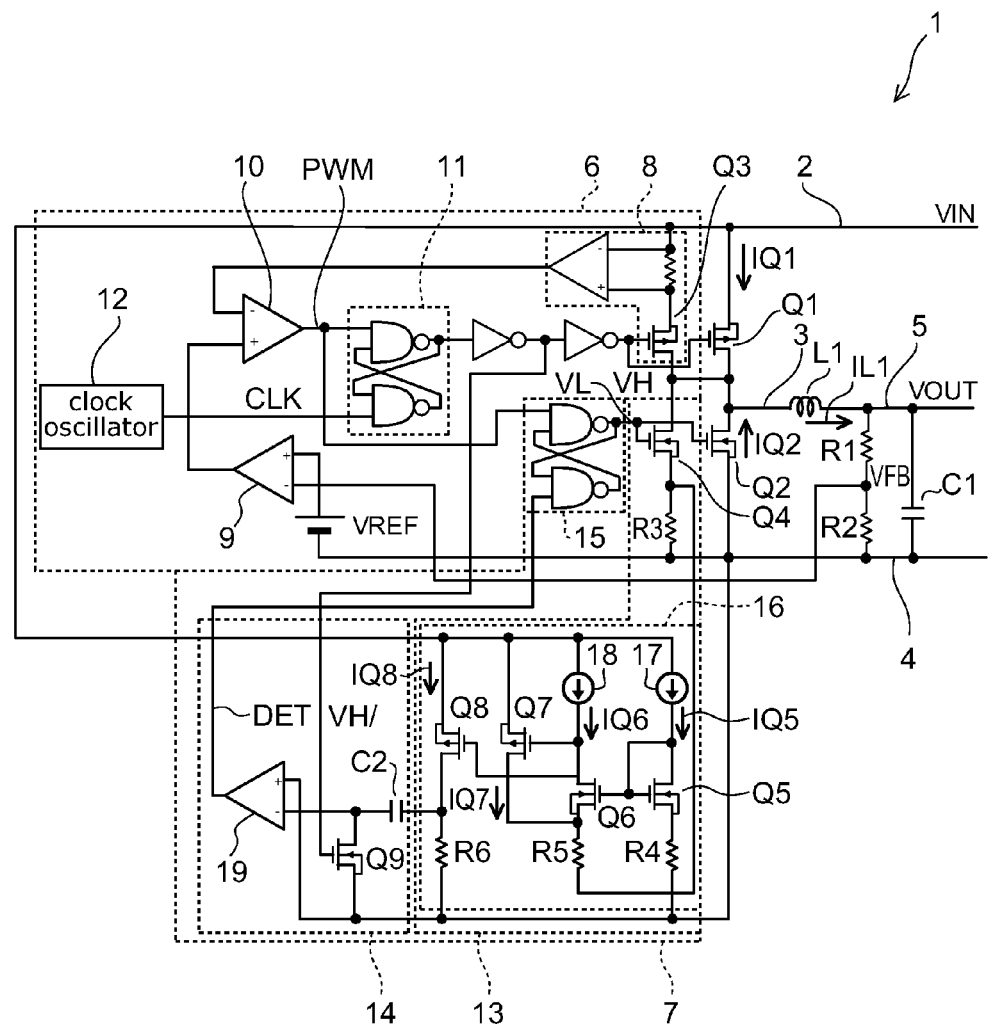
FIG. 1 is a circuit diagram illustrating a configuration of a DC-to-DC converter according to a first embodiment.

In general, according to one embodiment, a DC-to-DC converter includes a high-side switch, a low-side switch, a high-side controller, and a low-side controller. The low-side switch is connected to the high-side switch in series. The high-side controller is configured to control the high-side switch. The low-side controller includes a first detector and an offset canceller. The first detector is configured to detect a current of the low-side switch. The offset canceller is configured to hold an output of the first detector as an offset voltage when the low-side switch is off and compensate an output of the first detector by the offset voltage when the low-side switch is on. The low-side controller is configured to compare a compensated output of the first detector with a reference voltage and turn off the low-side switch.

Hereinafter, embodiments will now be described in detail with reference to the drawings. In the specification and drawings, components similar to those described or illustrated in a drawing thereinabove are marked with like reference numerals, and a detailed description is omitted as appropriate.

First Embodiment

FIG. 1 is a circuit diagram illustrating a configuration of a DC-to-DC converter according to a first embodiment.

A DC-to-DC converter 1 includes a high-side switch Q1, a low-side switch Q2 connected to the high-side switch Q1 in series, a high-side controller 6 that controls the high-side switch Q1, a low-side controller 7 that controls the low-side switch Q2, and so on. The DC-to-DC converter 1 outputs an output voltage VOUT that a supply voltage VIN is decreased.

The high-side switch Q1 is connected between a power supply line 2 and a driving line 3. The low-side switch Q2 is connected between the driving line 3 and a ground line 4. The low-side switch Q2 is connected to the high-side switch Q1 in series.

In FIG. 1, the high-side switch Q1 is a P-channel MOSFET (referred to as a PMOS below). The low-side switch Q2 is an N-channel MOSFET (referred to as an NMOS below). However, the high-side switch Q1 may be an NMOS. An IGBT (Insulated-Gate Bipolar Transistor), BJT (Bipolar Junction Transistor), or the like may be used for the high-side switch Q1 and the low-side switch Q2.

One end of an inductor L1 is connected to the high-side switch Q1 and the low-side switch Q2 through the driving line 3. The other end of the inductor L1 is connected to an output line 5. Feedback resistors R1 and R2 and a smoothing capacitor C1 are connected between the output line 5 and the ground line 4.

The inductor L1 is driven by the high-side switch Q1 through the driving line 3, and generates the output voltage VOUT at the output line 5. The output voltage VOUT is smoothened with the smoothing capacitor C1. The feedback resistors R1 and R2 generate a voltage VFB from the output voltage VOUT. The voltage VFB is fed back to the high-side controller 6.

In FIG. 1, the voltage VFB that the output voltage VOUT is divided by the feedback resistors R1 and R2 is fed back to the high-side controller 6. However, the output voltage VOUT may be fed back to the high-side controller 6 as the voltage VFB.

The high-side switch Q1 is controlled to be turned on or off according to a high-side control signal VH outputted from the high-side controller 6. Since the high-side switch Q1 is a PMOS, the logic of the high-side control signal VH is a negative logic. The high-side switch Q1 is turned on when the high-side control signal VH is at low level, and the high-side switch Q1 is turned off when the high-side control signal VH is at high level.

The low-side switch Q2 is controlled to be turned on or off according to a low-side control signal VL outputted from the low-side controller 7. Since the low-side switch Q2 is an NMOS, the logic of the low-side control signal VL is a positive logic. The low-side switch Q2 is turned off when the low-side control signal VL is at low level, and the low-side switch Q2 is turned on when the low-side control signal VL is at high level.

The high-side controller 6 controls the high-side switch Q1 to be turned on or off in such a way that the voltage VFB fed back from the output voltage VOUT is made equal to a reference voltage VREF.

The high-side controller 6 controls the high-side switch Q1 to be turned on or off by comparing an error between the voltage VFB and the voltage VREF with a current IQ1 of the high-side switch Q1.

The current IQ1 of the high-side switch Q1 is detected by a second detector 8. The second detector 8 detects the current IQ1 of the high-side switch Q1 by converting the current of a second detecting transistor Q3 connected in parallel to the high-side switch Q1 into a voltage. The current of the second detecting transistor Q3 is proportional to the current IQ1 of the high-side switch Q1, and the second detector 8 outputs a voltage proportional to the current IQ1.

It is noted that the current IQ1 of the high-side switch Q1 when the high-side switch Q1 is on is equal to a current IL1 of the inductor L1. The second detector 8 detects the current IL1 of the inductor L1 by detecting the current IQ1 of the high-side switch Q1.

The error between the voltage VFB and the voltage VREF is amplified at an error amplifier 9. The output of the error amplifier 9 is inputted to the positive input terminal of a second comparator 10. The negative input terminal of the second comparator 10 receives the detected value of the current IQ1 of the high-side switch Q1 from the second detector 8.

The second comparator 10 outputs high level when the error inputted to the positive input terminal is greater than the detected value of the current IQ1 inputted to the negative input terminal. The second comparator 10 outputs low level when the error inputted to the positive input terminal is smaller than the detected value of the current IQ1 inputted to the negative input terminal.

An output signal PWM of the second comparator 10 is inputted to the set terminal of a second latch circuit 11 consists of two NANDs (AND-inverters). A clock signal CLK generated by a clock oscillator 12 is inputted to the reset terminal of the second latch circuit 11. The output of the second latch circuit 11 is outputted as the high-side control signal VH through the inverters in two stages. The second latch circuit 11 is set when low level is inputted to the set terminal, and the second latch circuit 11 outputs high level and holds the value. The second latch circuit 11 is reset when low level is inputted to the reset terminal, and the second latch circuit 11 outputs low level and holds the value.

The high-side controller 6 operates in synchronization with the clock signal CLK. The second latch circuit 11 is reset when the clock signal CLK is at low level, and the second latch circuit 11 outputs low level. The high-side control signal VH is made at low level, and the high-side switch Q1 is turned on. The second latch circuit 11 is set when the output of the second comparator 10 is at low level, and the second latch circuit 11 outputs high level. The high-side control signal VH is made at high level, and the high-side switch Q1 is turned off.

Therefore, when the detected value of the current IQ1 is smaller than the error between the voltage VREF and the voltage VFB, the high-side controller 6 outputs low level to the high-side control signal VH to control the high-side switch Q1 to be turned on. When the detected value of the current IQ1 is greater than the error between the voltage VREF and the voltage VFB, the high-side controller 6 outputs high level to the high-side control signal VH to control the high-side switch Q1 to be turned off.

In FIG. 1, the configuration of the current control mode is illustrated in which the second detector 8 is provided and the high-side switch Q1 is controlled using the current IQ1 of the high-side switch Q1. However, such a configuration may be possible that the configuration is based on the voltage control mode and the second detector 8 is omitted.

The low-side controller 7 outputs the low-side control signal VL that controls the low-side switch Q2 to be turned on or off. The low-side controller 7 outputs the low-side control signal VL that turns off the low-side switch Q2 when the high-side switch Q1 is on.

The low-side controller 7 outputs the low-side control signal VL that controls the low-side switch Q2 to be turned on when the high-side switch Q1 is off, and the low-side controller 7 outputs the low-side control signal VL that turns off the low-side switch Q2 when a current IQ2 of the low-side switch Q2 is made zero.

In the DC-to-DC converter 1, when the high-side switch Q1 is off, the low-side switch Q2 is controlled to be turned on, and the DC-to-DC converter 1 operates according to the synchronous rectification mode. The regenerated current of the inductor L1 flows through the low-side switch Q2.

In the DC-to-DC converter 1, the current IQ2 of the low-side switch Q2 is detected, and the low-side switch Q2 is turned off when the current IQ2 is zero-crossed.

Thus, as explained in FIG. 2A to FIG. 2G, it is possible to prevent the current IL1 of the inductor L1 from flowing backward, and it is possible to improve power efficiency.

Next, the low-side controller 7 will be described more in detail.

The low-side controller 7 has a first detector 13, an offset canceller 14, and a first latch circuit 15.

In the first detector 13, a first detecting resistor R3 is connected across the low-side switch Q2 in series through a first detecting transistor Q4. One end of the first detecting resistor R3 is connected to the ground line 4, and the other end is connected to the first detecting transistor Q4. A voltage proportional to the current IQ2 of the low-side switch Q2 is detected across the first detecting resistor R3.

The voltage across the first detecting resistor R3 is amplified at a first amplifier 16.

The first amplifier 16 is provided with a pair of current generators 17 and 18. The current generators 17 and 18 are connected to the power supply line 2. The current generators 17 and 18 supply constant currents to a pair of input transistors Q5 and Q6. The input transistor Q5 is diode-connected, and supplied with a constant current from the current generator 17. The input transistor Q5 is connected to one end of the first detecting resistor R3 through the first resistor R4. Namely, the input transistor Q5 is connected to the ground line 4.

A constant current is supplied from the current generator 18 to the input transistor Q6. The input transistor Q6 is connected to the other end of the first detecting resistor R3 through a second resistor R5.

Therefore, a pair of the input transistors Q5 and Q6 amplify the voltage across the first detecting resistor R3. The input transistors Q5 and Q6 are NMOSs in which electric characteristics such as threshold voltages are equally set.

A pair of output transistors Q7 and Q8 are connected to the power supply line 2, and amplify the output of the input transistor Q6. The output transistor Q7 outputs a current to the second resistor R5, and applies a negative feedback to the input transistor Q6. The output transistor Q8 outputs a current to a third resistor R6 connected to the ground line 4, and outputs, across the third resistor R6, a voltage that the voltage across the first detecting resistor R3 is amplified. The output transistors Q7 and Q8 are PMOSs in which electric characteristics such as threshold voltages are equally set.

The offset canceller 14 has a first capacitor C2 and a first switch element Q9. The first switch element Q9 is an NMOS. The gate of the first switch element Q9 receives the output signal of the second latch circuit 11, that is, a signal VH/ that the high-side control signal VH is inverted. The first switch element Q9 may be a PMOS or a BJT.

One end of the first capacitor C2 is connected to the output of the first detector 13, and the other end is connected to the ground line 4 through the first switch element Q9. The other end of the first capacitor C2 is connected to the positive input terminal of a first comparator 19. The negative input terminal of the first comparator 19 receives a ground potential, for example, as a reference voltage.

The first comparator 19 outputs high level when the potential at the positive input terminal is higher than the potential at the negative input terminal. The first comparator 19 outputs low level when the potential at the positive input terminal is lower than the potential at the negative input terminal. The output of the first comparator 19 is connected to the reset terminal of the first latch circuit 15.

The first latch circuit 15 consists of two NANDs as similar to the second latch circuit 11, and has a reset terminal and a set terminal. The first latch circuit 15 is reset when low level is inputted to the reset terminal, and the first latch circuit 15 outputs low level and holds the value. The first latch circuit 15 is set when low level is inputted to the set terminal, and the first latch circuit 15 outputs high level and holds the value.

The set terminal of the first latch circuit 15 receives the output signal PWM of the second comparator 10 as similar to the set terminal of the second latch circuit 11. The first latch circuit 15 outputs the low-side control signal VL, and controls the low-side switch Q2 and the first detecting transistor Q4.

Next, the operations of the first detector 13 and the offset canceller 14 of the low-side controller 7 will be described.

It is supposed that the resistance of the first detecting resistor R3 is sufficiently smaller than the resistances of the first and second resistors R4 and R5 and currents generated at the current generators 17 and 18 are sufficiently smaller than the current IQ2 of the low-side switch Q2.

In the case where the low-side switch Q2 is off, the voltage across the first detecting resistor R3 due to the current IQ2 of the low-side switch Q2 is zero. A current IQ5 of the input transistor Q5 is equal to the value of a current generated at the current generator 17. A current IQ6 of the input transistor Q6 is equal to the value of a current generated at the current generator 18. The current of the output transistor Q7 is IQ7.

The current IQ5 of the input transistor Q5 flows through the first resistor R4. A current IQ6+IQ7 flows through the second resistor R5. In this state, the constants are set in such a way that the source potentials of the input transistors Q5 and Q6 are made equal to each other. For example, the resistances of the first and second resistors R4 and R5 can be set in such a way that currents generated at the current generators 17 and 18 are made equal to each other and the source potentials of the input transistors Q5 and Q6 are made equal to each other. Alternatively, currents generated at the current generators 17 and 18 can be set in such a way that the resistances of the first and second resistors R4 and R5 are set equal to each other and the source potentials of the input transistors Q5 and Q6 are made equal to each other.

The gate-source voltage of the output transistor Q8 is equal to the gate-source voltage of the output transistor Q7. Therefore, a current IQ8 of the output transistor Q8 is equal to the current IQ7 of the output transistor Q7, and the current IQ7 of the output transistor Q7 is copied to the output transistor Q8.

A voltage caused by the current IQ8 (=IQ7) is generated across the third resistor R6.

Since the inverting signal VH/ of the high-side control signal VH is at high level, the first switch element Q9 of the offset canceller 14 is on. Therefore, the voltage across the third resistor R6 is charged as an offset voltage in the first capacitor C2 of the offset canceller 14.

The offset canceller 14 holds the output of the first detector 13 when the low-side switch Q2 is off as an offset voltage.

As described above, the input transistors Q5 and Q6 and the output transistors Q7 and Q8 are set in such a way that their electric characteristics are matched with each other. However, variations occur in the source potentials of the input transistors Q5 and Q6, for example, because of variations in manufacture processes or the like. Variations also occur in the currents IQ7 and IQ8 of the output transistors Q7 and Q8.

Thus, the offset voltage held at the offset canceller 14 includes an error caused by variations in manufacture processes or the like.

In the case where the low-side switch Q2 is turned on, a current proportional to the current IQ2 of the low-side switch Q2 flows through the first detecting resistor R3, and the potential at the other end of the first detecting resistor R3 inputted to the first amplifier 16 is made negative.

Since the source potential of the input transistor Q6 is decreased, the output voltage of the input transistor Q6 is decreased. Since the gate potentials of the output transistors Q7 and Q8 are decreased, the currents IQ7 and IQ8 (=IQ7) of the output transistors Q7 and Q8 are also increased.

Since the current IQ7 of the output transistor Q7 is fed back to the second resistor R5, the source potential of the input transistor Q6 is increased. Therefore, the negative feedback of the output transistor Q7 causes the source potential of the input transistor Q6 to be equal to the source potential of the input transistor Q5.

As described above, in the case where the low-side switch Q2 is turned on, although the potential at the other end of the first detecting resistor R3 is decreased, the current IQ7 of the output transistor Q7 is increased in such a way that the source potentials of the input transistors Q5 and Q6 are made equal to each other.

The current IQ6 of the input transistor Q6 is equal to a current generated at the current generator 18.

Therefore, the currents IQ7 and IQ8 (=IQ7) of the output transistors Q7 and Q8 are made equal to a current proportional to the current IQ2 of the low-side switch Q2 flowing through the first detecting resistor R3. A voltage that the detected value of the current IQ2 of the low-side switch Q2 is added to the aforementioned offset voltage is produced across the third resistor R6.

When the low-side switch Q2 is on, the high-side switch is off, and the high-side control signal VH is at high level. Therefore, the first switch element Q9 is off.

The voltage across the third resistor R6 is inputted as the output of the first detector 13 to the first comparator 19 through the first capacitor C2.

The first capacitor C2 holds the offset voltage. Thus, the first comparator 19 receives a compensated output of the first detector 13 and compares a compensated output of the first detector 13 with a reference voltage. The offset canceller 14 subtracts the offset voltage from the output of the first detector 13, i.e. the detected value of the current IQ2 of the low-side switch Q2. In other words, the offset canceller 14 compensates the output of the first detector 13 by the offset voltage.

The first comparator 19 outputs high level as an output signal DET because the output of the first detector 13 inputted to the positive input terminal is positive. When the current IQ2 of the low-side switch Q2 is made zero, the first comparator 19 outputs low level as the output signal DET.

As described above, in the low-side controller 7, it is possible that the offset canceller 14 cancels an offset caused by variations in the first amplifier 16 of the first detector 13, or the like. Thus, it is possible to highly accurately detect the current IQ2 of the low-side switch Q2. It is possible to highly accurately detect the zero cross of the current IQ2 of the low-side switch Q2.

In the low-side controller 7, the first amplifier 16 amplifies the voltage across the first detecting resistor R3. Thus, it is possible that the detection error of the zero cross of the current IQ2 of the low-side switch Q2 caused by the offset voltage of the first comparator 19 is suppressed by the gain of the first amplifier 16. The output amplitude of the first detector 13 inputted to the first comparator 19 is increased by the gain of the first amplifier 16. Thus, the operation of the first comparator 19 is made much faster, and the detection accuracy of the zero cross of the current IQ2 of the low-side switch Q2 is improved.

Next, the operation of the DC-to-DC converter 1 will be described with reference to timing charts.

FIG. 2A to FIG. 2G show timing charts of the main signals of the DC-to-DC converter. FIG. 2A shows the clock signal CLK, FIG. 2 FIG. 2B shows the current IQ1 of the high-side switch, FIG. 2C shows the current IQ2 of the low-side switch, FIG. 2D shows the output signal PWM of the second comparator, FIG. 2E shows the output signal DET of the offset canceller, FIG. 2F shows the high-side control signal VH, and FIG. 2G shows the low-side control signal VL.

In FIG. 2F, indications ON and OFF express that the high-side switch Q1 is controlled to be on or off, respectively. In FIG. 2G, indications ON and OFF express that the low-side switch Q2 is controlled to be on or off.

The clock signal CLK is a negative pulse signal with a short low level period (FIG. 2A). One period of the clock signal CLK is one cycle, and the DC-to-DC converter 1 operates in synchronization with the clock signal CLK.

When the clock signal CLK falls from high level to low level (FIG. 2A), the second latch circuit 11 is reset, and outputs low level.

The high-side control signal VH is made at low level (FIG. 2F), and the high-side switch Q1 is turned on. The current IQ1 of the high-side switch Q1 is increased (FIG. 2B). Since the signal VH/ that negates the high-side control signal VH is at high level, the first switch element Q9 is turned on. The output signal DET of the first comparator 19 is made at low level (FIG. 2E), and the reset terminal of the first latch circuit 15 receives low level.

Since the output signal PWM of the second comparator 10 is at high level (FIG. 2D), the first latch circuit 15 is reset, and the low-side control signal VL is made at low level (FIG. 2G). The low-side switch Q2 is turned off. The current IQ2 of the low-side switch Q2 is zero (FIG. 2C).

When the current IQ1 of the high-side switch Q1 is increased and the output signal PWM is changed from high level to low level (FIG. 2D), the second latch circuit 11 and the first latch circuit 15 are reset, and output high level. The high-side control signal VH and the low-side control signal VL are made at high level (FIG. 2F and FIG. 2G).

The high-side switch Q1 is turned off, and the output signal PWM of the second comparator 10 is returned to high level (FIG. 2D).

The low-side switch Q2 is turned on, and the current IQ2 of the low-side switch Q2 flows (FIG. 2C). The current IQ2 of the low-side switch Q2 is the regenerated current IL1 flowing through the inductor L1, and decreased with time.

When the current IQ2 of the low-side switch Q2 is zero-crossed, the output signal DET of the offset canceller 14 is changed to low level (FIG. 2E).

The first latch circuit 15 is reset, and the low-side control signal VL is returned to low level (FIG. 2G).

The second latch circuit 11 is rest at the falling edge of the subsequent clock signal CLK. The similar operations are repeated after the subsequent cycle.

As described above, the zero cross of the current IQ2 of the low-side switch Q2 is detected to turn off the low-side switch Q2, so that the regenerated current IL1 of the inductor L1 does not flow backward. Thus, it is possible to suppress power consumption caused by the regenerated current IL1 flowing backward and improve power efficiency.

As described above, in the DC-to-DC converter 1, it is possible that the offset canceller 14 cancels an offset caused by variations in the first amplifier 16 of the first detector 13, or the like. Thus, it is possible to highly accurately detect the current IQ2 of the low-side switch Q2. It is possible to highly accurately detect the zero cross of the current IQ2 of the low-side switch Q2. It is possible to suppress power consumption caused by the regenerated current IL1 flowing backward and further improve power efficiency.

In the DC-to-DC converter 1, the first amplifier 16 amplifies the voltage across the first detecting resistor R3. Thus, it is possible that the detection error of the zero cross of the current IQ2 of the low-side switch Q2 caused by the offset voltage of the first comparator 19 is suppressed by the gain of the first amplifier 16.

The output amplitude of the first detector 13 inputted to the first comparator 19 is increased by the gain of the first amplifier 16. Thus, the operation of the first comparator 19 is made much faster, and the detection accuracy of the zero cross of the current IQ2 of the low-side switch Q2 is improved.

Therefore, it is possible to suppress power consumption caused by the regenerated current IL1 flowing backward and further improve power efficiency.

In FIG. 1 and FIG. 2A to FIG. 2G, the case is illustrated where the negative input terminal of the first comparator 19 receives the ground potential as a reference voltage. However, it is possible to adjust the timing to turn off the low-side switch Q2 by adjusting the reference voltage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A DC-to-DC converter device comprising: a high-side switch; a low-side switch connected to the high-side switch in series; a high-side controller configured to control the high-side switch; and a low-side controller including: a first detector configured to detect a current of the low-side switch; wherein the first detector includes: a first detecting transistor; a first detecting resistor connected across the low-side switch through the first detecting transistor; and a first amplifier configured to amplify a voltage across the first detecting resistor, wherein the first amplifier includes: a pair of current generators; a pair of input transistors configured to amplify the voltage across the first detecting resistor, the pair of input transistors being supplied with constant currents from the pair of the current generators, one of the pair of input transistors being connected to one end of the first detecting resistor through a first resistor, one other of the pair of input transistors being connected to one other end of the first detecting resistor through a second resistor; and a pair of output transistors configured to amplify an output voltage of the pair of the input transistors, one of the pair of output transistors feeding back the output voltage to the second resistor, one other of the pair of output transistors outputting the output voltage to a third resistor connected to the one end of the first detecting resistor; and an offset canceller configured to hold an output of the first detector as an offset voltage when the low-side switch is off and compensate the output of the first detector by the offset voltage when the low-side switch is on, the low-side controller being configured to compare a compensated output of the first detector with a reference voltage and turn off the low-side switch.

2. The device according to claim 1,
wherein the low-side controller detects a zero cross of an output of the offset canceller and turns off the low-side switch.

3. The device according to claim 1,
wherein one of the pair of input transistors is diode-connected.

4. The device according to claim 1,
wherein the pair of input transistors are NMOSs.

5. The device according to claim 1,
wherein the pair of output transistors are PMOSs.

6. The converter device according to claim 1,
wherein the current generators generate equal currents.

7. The device according to claim 1,
wherein the low-side controller compares the compensated output of the first detector with a ground potential, and turns off the low-side switch.

8. The device according to claim 1,
wherein the low-side controller further includes a first latch circuit reset by an output of the offset canceller.

9. The device according to claim 1,
wherein the high-side controller includes a second detector configured to detect a current of the high-side switch.

10. The device according to claim 1,
wherein the high-side controller includes a clock oscillator.

11. The device according to claim 1, further comprising:
an inductor having one end and one other end, the one end of the inductor connected at a connection point between the high-side switch and the low-side switch;
a smoothing capacitor connected between the one other end of the inductor and a ground; and
a feedback resistor configured to feed back a voltage at the one other end of the inductor to the high-side controller, the feedback resistor connected between the one other end of the inductor and the ground.

12. The device according to claim 11,
wherein the low-side controller detects a zero cross of the output of an offset canceller and turns off the low-side switch.

13. The device according to claim 11,
wherein the low-side controller compares the compensated output of the first detector with a ground potential, and turns off the low-side switch.

14. The device according to claim 11,
wherein the low-side controller further includes a first latch circuit reset by an output of the offset canceller.

15. A DC-to-DC converter device comprising:
a high-side switch;
a low-side switch connected to the high-side switch in series;
a high-side controller configured to control the high-side switch; and
a low-side controller including:
  a first detector configured to detect a current of the low-side switch; and
  an offset canceller configured to hold an output of the first detector as an offset voltage when the low-side switch is off and compensate the output of the first detector by the offset voltage when the low-side switch is on,
wherein the offset canceller includes:
  a comparator having a negative input terminal connected to a ground;
  a first switch element configured to be turned on when the high-side switch is on and to be turned off when the high-side switch is off, the first switch element connected between a positive input terminal of the comparator and the ground; and
  a first capacitor configured to be charged with the offset voltage when the high-side switch is off, the first capacitor connected between the positive input terminal of the comparator and the first detector,
the low-side controller being configured to compare a compensated output of the first detector with a reference voltage and turn off the low-side switch.

* * * * *